US009605727B2

(12) United States Patent
Kim (10) Patent No.: US 9,605,727 B2
(45) Date of Patent: Mar. 28, 2017

(54) ACTIVE ENGINE MOUNT FOR VEHICLE

(71) Applicant: Hyundai Motor Company, Seoul (KR)

(72) Inventor: Seung Won Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/870,907

(22) Filed: Sep. 30, 2015

(65) Prior Publication Data

US 2016/0138671 A1    May 19, 2016

(30) Foreign Application Priority Data

Nov. 18, 2014  (KR) .................. 10-2014-0160853

(51) Int. Cl.
| | |
|---|---|
| F16F 5/00 | (2006.01) |
| F16F 13/22 | (2006.01) |
| F16F 13/10 | (2006.01) |
| F16F 13/26 | (2006.01) |
| B60K 5/12 | (2006.01) |

(52) U.S. Cl.
CPC ............ *F16F 13/22* (2013.01); *B60K 5/1283* (2013.01); *F16F 13/10* (2013.01); *F16F 13/26* (2013.01)

(58) Field of Classification Search
CPC ........ F16F 13/26; F16F 13/264; B60K 5/1283
USPC ........................................ 267/140.13–140.15
See application file for complete search history.

(56) References Cited

U.S. PATENT DOCUMENTS

| | | | | |
|---|---|---|---|---|
| 5,601,280 A | * | 2/1997 | Nagaya ................... | F16F 13/26 267/140.14 |
| 6,527,262 B2 | * | 3/2003 | Hagino ................. | F16F 13/264 267/140.14 |
| 2004/0150145 A1 | * | 8/2004 | Tewani ................. | F16F 13/264 267/140.14 |
| 2009/0039577 A1 | * | 2/2009 | Ishiguro ............... | B60K 5/1283 267/140.13 |
| 2012/0109457 A1 | * | 5/2012 | Okamoto .............. | F16F 13/264 701/36 |
| 2012/0242020 A1 | * | 9/2012 | Muraoka ................ | F16F 13/26 267/140.14 |

FOREIGN PATENT DOCUMENTS

| | | |
|---|---|---|
| JP | 11-082611 A | 3/1999 |
| JP | 2001-027279 A | 1/2001 |
| JP | 2002-206591 A | 7/2002 |
| JP | 2004-150546 A | 5/2004 |

(Continued)

*Primary Examiner* — Christopher Schwartz
(74) *Attorney, Agent, or Firm* — McDermott Will & Emery LLP (57) ABSTRACT

An active engine mount for a vehicle includes an upper body which has a main rubber and an upper liquid chamber, and a lower body which is coupled to a lower portion of the upper body. An orifice circular plate divides an interior of the upper and lower bodies into the upper liquid chamber and a lower liquid chamber inside the upper and lower bodies, and has an orifice through which a fluid flows between the upper and lower liquid chambers. A diaphragm is installed below the orifice circular plate inside the upper and lower bodies, and forms the lower liquid chamber. A semi-active mount is in contact with a central portion of the diaphragm by a plunger inside the lower body, and operates by an electromagnet.

7 Claims, 13 Drawing Sheets

(56) References Cited

FOREIGN PATENT DOCUMENTS

| | | | |
|---|---|---|---|
| JP | 2005-282821 A | 10/2005 | |
| JP | 2006-055767 A | 3/2006 | |
| JP | 2006-194270 A | 7/2006 | |
| KR | 10-2013-0003749 A | 1/2013 | |
| KR | 10-2013-0003751 A | 1/2013 | |
| KR | 20130003749 | * 10/2013 | ............... B60K 5/12 |
| KR | 10-2014-0076404 A | 6/2014 | |

* cited by examiner

ACTIVE ENGINE MOUNT FOR VEHICLE

CROSS-REFERENCE TO RELATED APPLICATION

This application claims under 35 U.S.C. §119 a the benefit of priority to Korean Patent Application No. 10-2014-0160853 filed on Nov. 18, 2014, the entire content of which is incorporated herein by reference.

TECHNICAL FIELD

The present disclosure relates to an active engine mount for a vehicle. More particularly, the present disclosure relates to an electronic bypass type semi-active engine mount.

BACKGROUND

In general, vibration and noise occur due to vertical reciprocating motion of a piston and a connecting rod in an engine of a vehicle, a rotational inertial force of a crank shaft connected to the connecting rod that reciprocates vertically, and due to shaking of the crank shaft which occurs in a longitudinal direction of the crank shaft when the crank shaft rotates.

In order to prevent such vibration and noise from being transferred to a vehicle body, the engine is mounted on the vehicle body using an engine mount that is made of a rubber material having predetermined elasticity.

The engine mount made of a rubber material exhibits excellent performance in absorbing and damping vibration with micro amplitude at a high frequency among vibration that occurs when the engine starts, but is very vulnerable to vibration with a large displacement at a low frequency. Thus, the engine mount made of a rubber material does not sufficiently cope with both of the vibration with micro amplitude at the high frequency and the vibration with the large displacement at the low frequency.

Accordingly, a fluid encapsulated engine mount has been used, which absorbs and damps all vibration over widespread ranges including vibration with a micro amplitude at a high frequency and vibration with a large displacement at a low frequency which are input to the engine mount by operating an engine.

In general, in order to improve fuel efficiency of the vehicle, an active mount, a semi-active mount, and the like for preventing noise, vibration, and harshness (NVH) performance from deteriorating, are used. Typically, a semi-active mount controls dynamic characteristics of the mount in an on-off manner.

The semi-active mount is classified into a volume stiffness mount, and a bypass mount, and these mounts have different implementation methods and dynamic characteristics.

The bypass mount has low characteristics (a dynamic ratio of about 0.6) at a low-frequency range (20 to 40 Hz) and is mainly used for a diesel engine since the bypass mount has lower dynamic characteristics in a low frequency range than the volume stiffness mount. Thus, idle performance is maximized.

On the other hand, the volume stiffness mount has lower dynamic characteristics at a high frequency than the bypass mount, and the volume stiffness mount has higher dynamic characteristics at a low frequency than the bypass mount.

The bypass mount, which is typically and commercially available, uses vacuum pressure (at an intake manifold), and thus deteriorating the layout and combustion back pressure.

In comparison with the vacuum pressure mount, the electronic mount uses electromagnetic force generated in a vehicle such that there is no loss of combustion pressure. Accordingly, electric wires (wiring) may be more easily laid out than hoses for transferring vacuum pressure, and as a result, the electronic mount has been used widely.

The present disclosure proposes an electronic semi-active mount.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide an active engine mount for a vehicle which is a system in which an (elongated) orifice for maximizing characteristics of an electronic bypass mount and a bypass unit are incorporated, and may maximize spatial utilization and maximize characteristics of a loss factor, by positioning an inlet of an elongated nozzle at a central portion of an upper liquid chamber to which the largest amount of volume pressure is applied, and using the active engine mount together with the bypass mount.

In order to achieve the aforementioned object, an active engine mount for a vehicle provided by the present disclosure has the following features.

According to an embodiment of the present inventive concept, an active engine mount for a vehicle includes an upper body which has a main rubber and an upper liquid chamber. A lower body is coupled to a lower portion of the upper body. An orifice circular plate divides an interior of the upper and lower bodies into the upper liquid chamber and a lower liquid chamber inside the upper and lower bodies, and has an orifice through which a fluid flow between the upper and lower liquid chambers. A diaphragm is installed below the orifice circular plate inside the upper and lower bodies, and forms the lower liquid chamber. A semi-active mount is in contact with a central portion of the diaphragm by a plunger inside the lower body, and operates an electromagnet.

The active engine mount may further include a switching valve which covers a hole formed at a central portion of the orifice circular plate at the central portion of the diaphragm, and compressively deforms by pressure of the fluid in the upper liquid chamber.

The active engine mount may further include a fork which is coupled to a bottom surface of the switching valve at the central portion of the diaphragm, and forms an air chamber between the fork and the switching valve.

The switching valve and the fork may be coupled to an upper end of the plunger of the semi-active mount, and may open and close the hole formed in the orifice circular plate while moving upward and downward when the semi-active mount operates.

The active engine mount for a vehicle provided by the present disclosure has the following advantages.

First, the air chamber is applied to the switching valve, and dynamic characteristics at a high frequency is reduced (vibration isolation property is improved), thereby preventing excitation vibration, penetration sound, and micro shaking.

Second, the switching valve is positioned at a center of a mount insulator hole to which the largest amount of upper pumping pressure of the mount is applied, thereby maximizing a loss factor.

Third, a method of tuning a length of the elongated path of the mount is adopted, and as a result, a degree of freedom in tuning is higher than that in the existing method.

Fourth, a package layout of the active engine mount is improved compared to the existing method of using negative pressure (negative vacuum pressure) in which combustion pressure is not affected because negative pressure is not used at an intake manifold.

Other aspects and embodiments of the inventive concept are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g., fuel derived from resources other than petroleum. As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present inventive concept.

It should be understood that the appended drawings are not necessarily to scale, presenting a somewhat simplified representation of various features illustrative of the basic principles of the invention. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter, reference will now be made in detail to various embodiments of the present inventive concept, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, the present invention will be described in detail with reference to the accompanying drawings.

Figure 1:
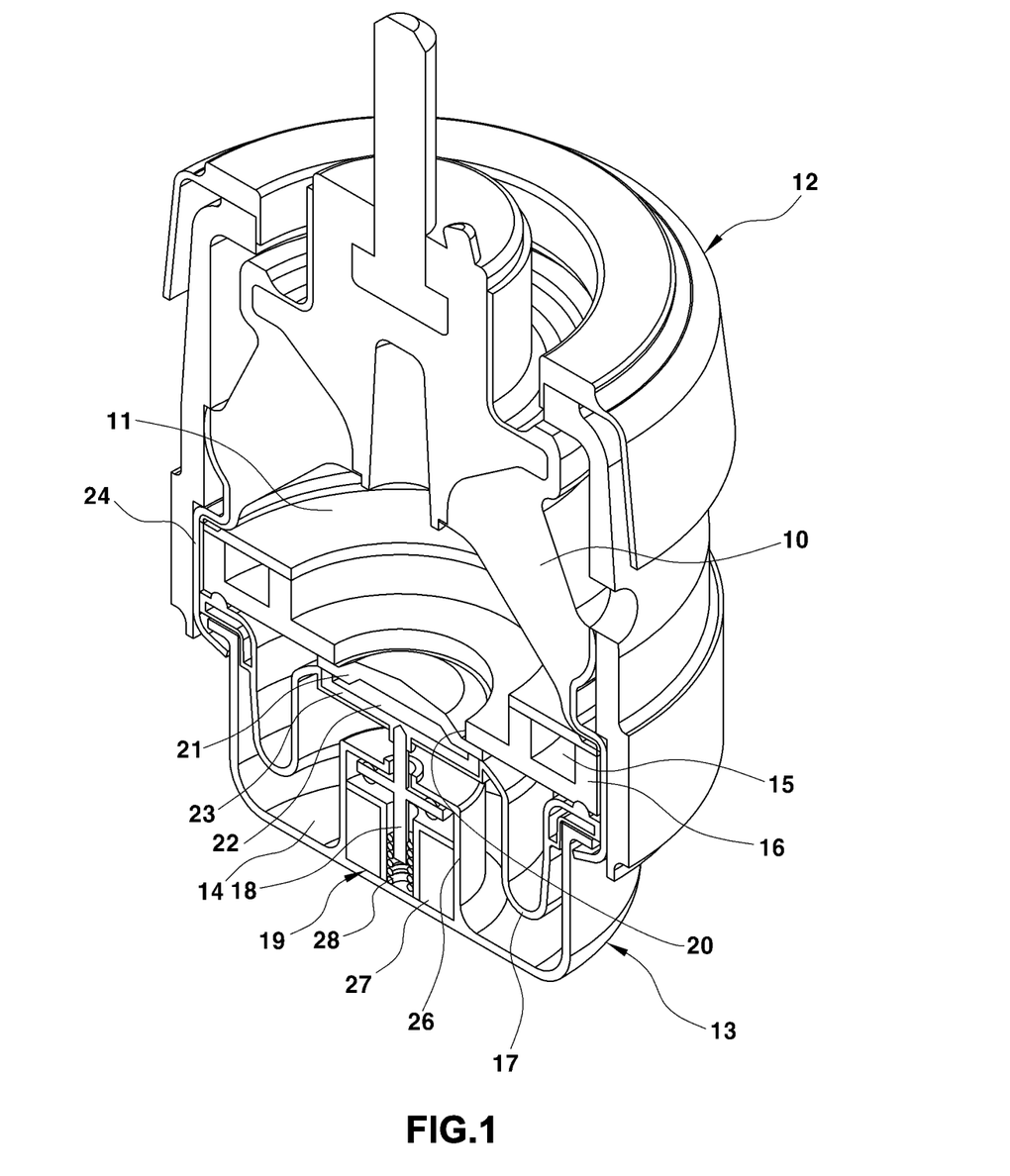
FIG. 1 is a perspective view illustrating an active engine mount for a vehicle according to an exemplary embodiment of the present inventive concept
Figure 2:
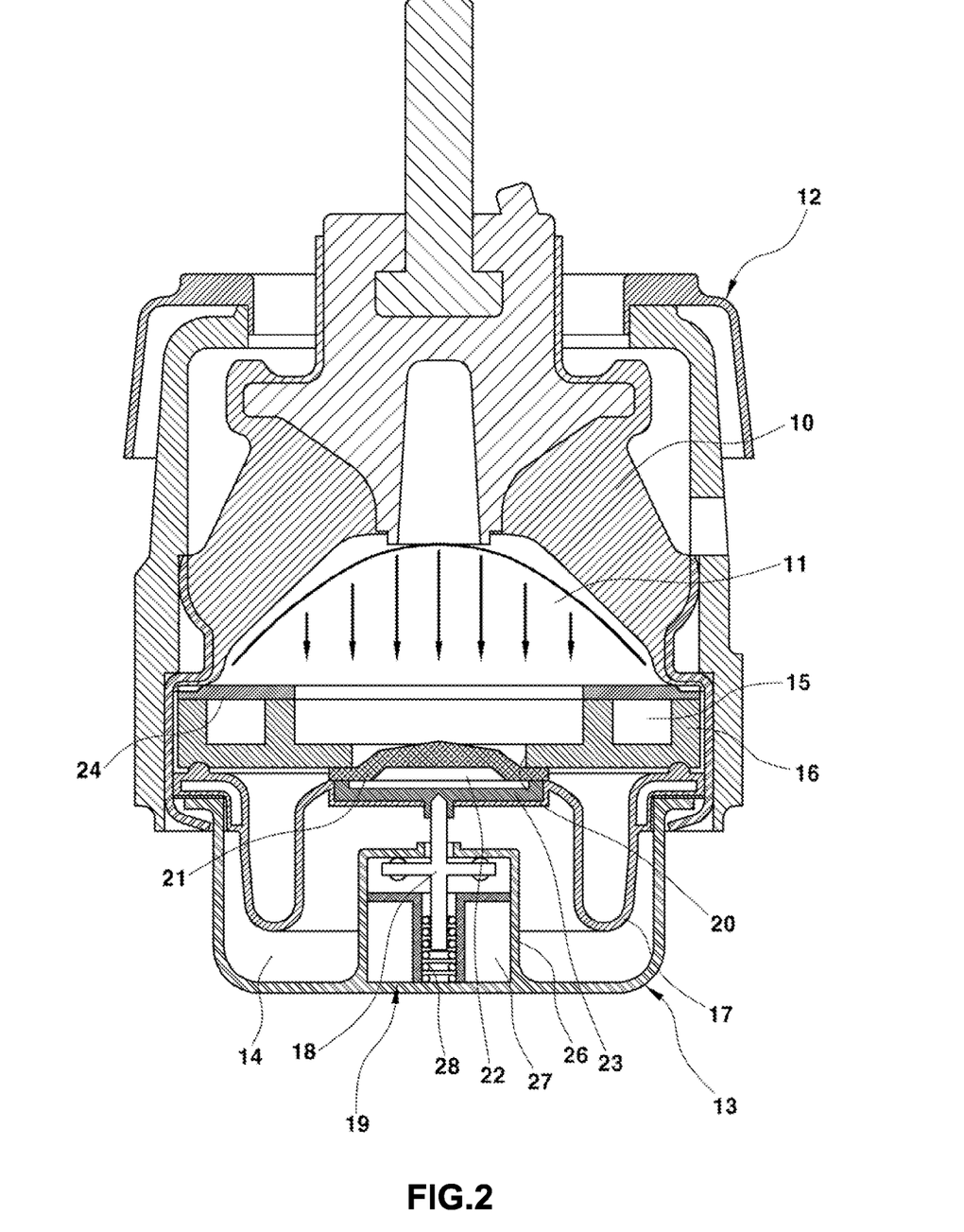
FIG. 2 is a cross-sectional view illustrating the active engine mount for a vehicle according to the exemplary embodiment of the present inventive concept.

FIGS. 1 and 2 are a perspective view and a cross-sectional view illustrating an active engine mount for a vehicle according to an exemplary embodiment of the present inventive concept.

As illustrated in FIGS. 1 and 2, the active engine mount includes an upper body 12 and a lower body 13 that are installed at an engine side and at a frame side, respectively. The upper body 12 and the lower body 13 are integrally coupled to each other by flanges that are formed at a lower end of the upper body 12 and at an upper end of the lower body 13, respectively.

Further, a main rubber 10 is integrally formed in the upper body 12, and an upper liquid chamber 11 is formed at the bottom of the main rubber 10 such that a space between the upper liquid chamber 11 and an orifice circular plate 16 to be described below is filled with a fluid.

In addition, the orifice circular plate 16 is installed in the upper body 12 and the lower body 13. In this case, the orifice circular plate 16 may divide an interior of the upper body 12 and the lower body 13 into the upper liquid chamber 11 and a lower liquid chamber 13 to be described below while being supported by a structure in which an edge of the orifice circular plate 16 is fitted into a bent portion formed at the lower end of the upper body 12.

Figure 3A:
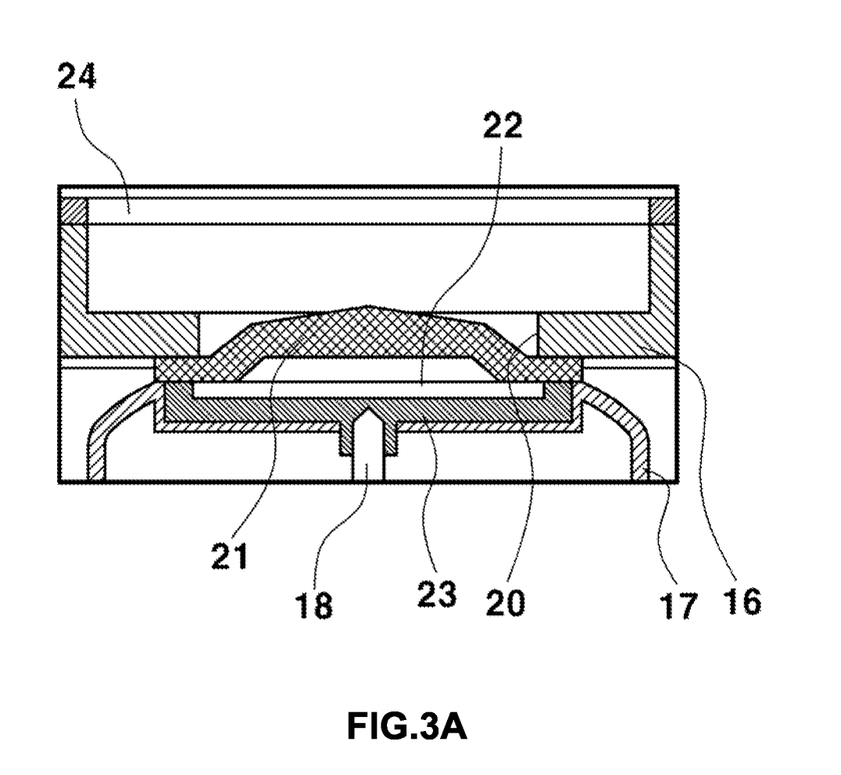
FIGS. 3A and 3B are enlarged views illustrating an orifice of the active engine mount for a vehicle according to the exemplary embodiment of the present inventive concept.
Figure 3B:
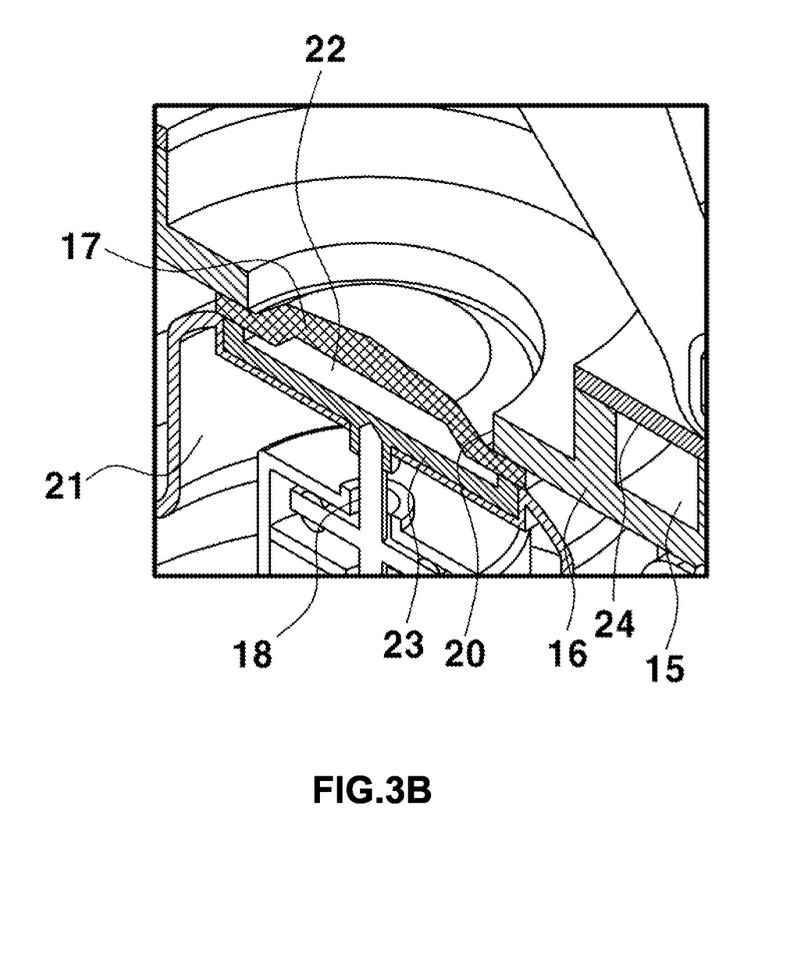
Figure 4A:
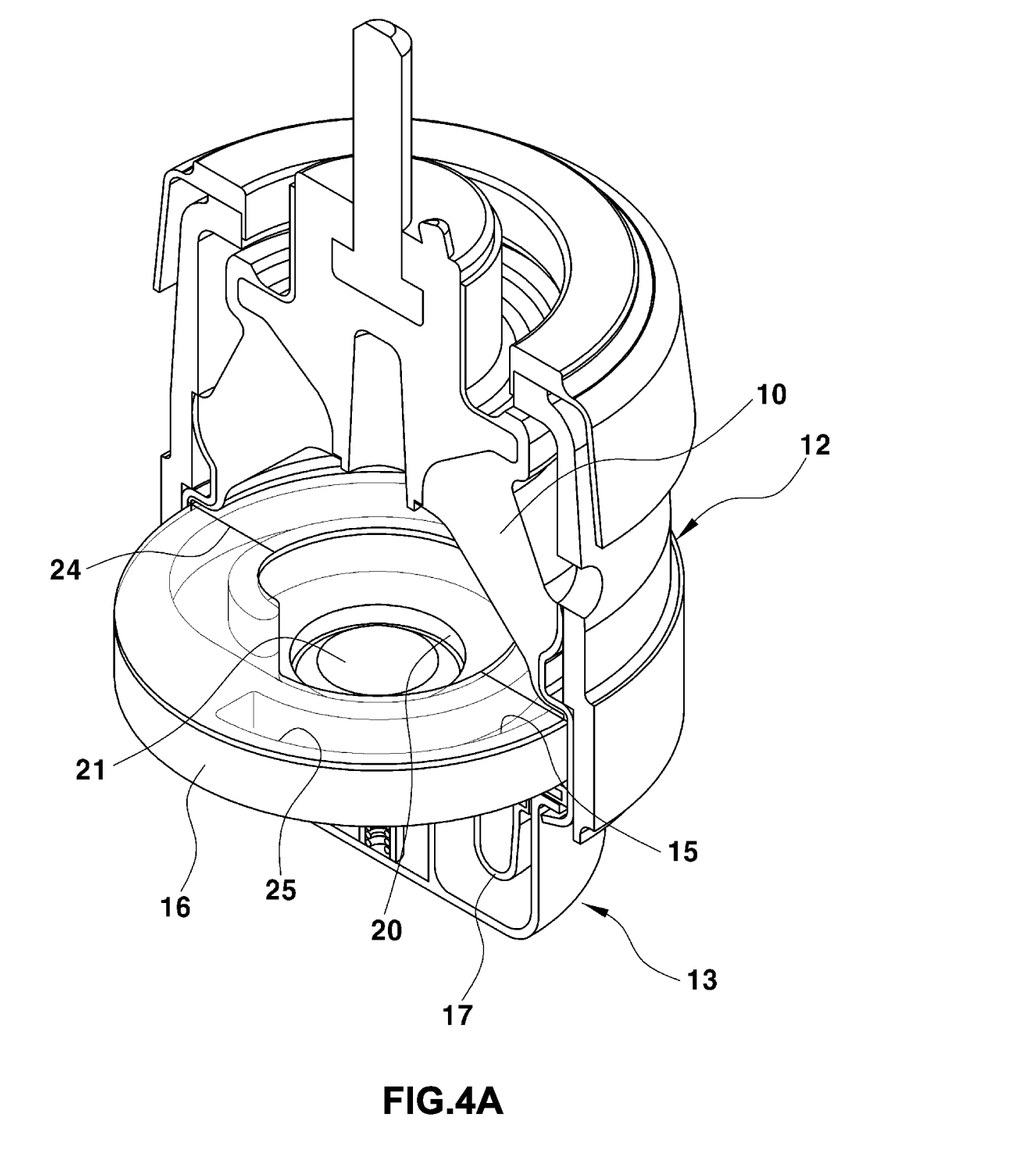
FIGS. 4A and 4B are perspective views illustrating a switching valve and a fork of the active engine mount for a vehicle according to the exemplary embodiment of the present inventive concept.
Figure 4B:
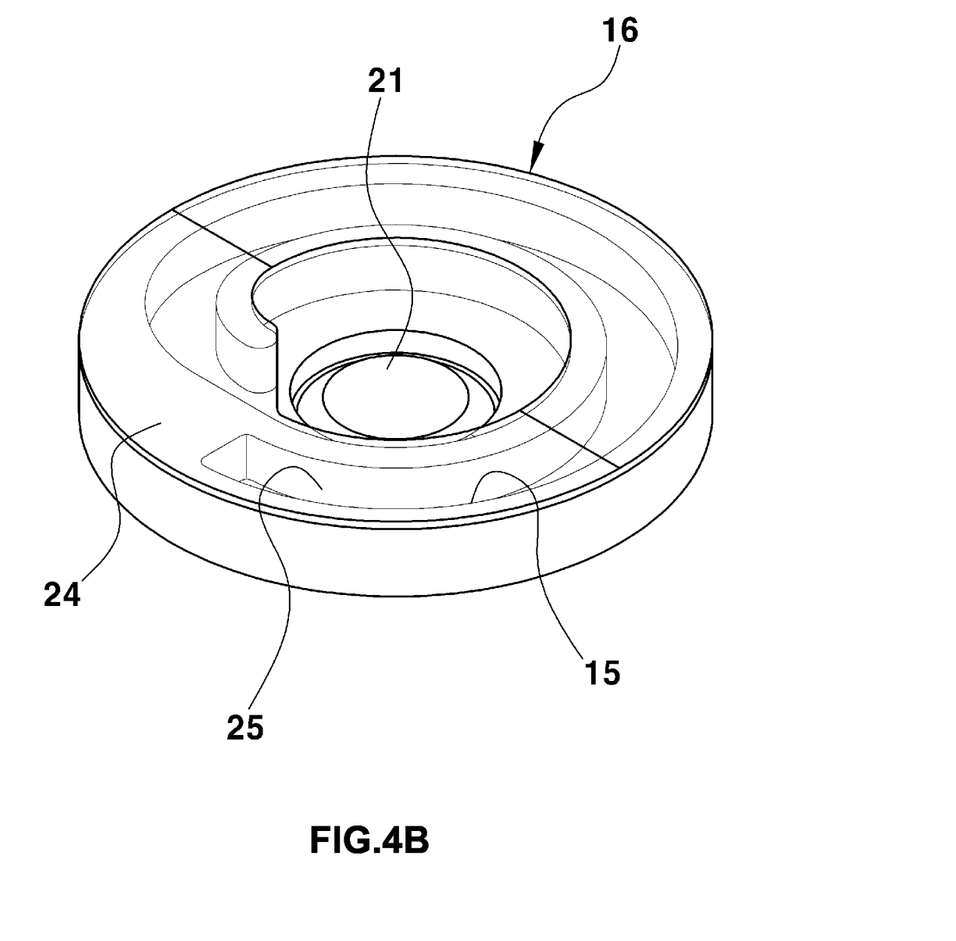

As illustrated in FIGS. 3 and 4, the orifice circular plate 16 has an orifice 15 formed in an upper surface of the orifice circular plate 16 along a circumference of the circular plate 16 and along a circular trajectory at a central region. The orifice 15 guides a flow of the fluid when the fluid in the upper and lower liquid chambers 11 and 14 flows between the liquid chambers.

For example, a ring-shaped vibratory plate 24 is installed on the upper surface of the orifice circular plate 16, such that an edge section of the orifice 15 is covered by the vibratory plate 24. Further, a fluid entrance hole 25 is formed at an end of the edge section of the orifice 15, and a central portion of the orifice 15 is in communication with the upper liquid chamber 11.

Accordingly, the fluid may flow between the upper liquid chamber 11 and the lower liquid chamber 14 while flowing along a path of the upper liquid chamber⇆the central portion of the orifice⇆the orifice⇆the fluid entrance hole-⇆the lower liquid chamber.

A hole 20 is formed at a bottom side of a central portion of the orifice circular plate 16 communicates with the upper liquid chamber 11, and the hole 20 may be open and closed by a switching valve 21 to be described below.

A diaphragm 17, which is made of rubber and may be changed in volume by the fluid flowing therein, is installed in the upper body 12 and the lower body 13. The diaphragm 17 is disposed below the orifice circular plate 16, and an edge portion of the diaphragm 17 is coupled by being fitted between a bottom surface of the orifice circular plate 16 and an upper surface of the flange of the lower body 13.

A space between the diaphragm 17 and the bottom surface of the orifice circular plate 16 is formed as the lower liquid chamber 14, and the lower liquid chamber 14 communicates with the fluid entrance hole 25 of the orifice 15 formed in the orifice circular plate 16.

A semi-active mount 19, which is turned on and off by an electromagnet, is installed in the lower body 13.

Here, the semi-active mount 19 is turned on while an engine idles after the engine starts and turned off when the vehicle travels after the vehicle begins to move, which may be controlled by a controller (not illustrated) based on an engine revolutions per minute (RPM).

The semi-active mount 19 includes a housing 26 formed at a central portion of the lower body 13. An electromagnet 27 is installed in the housing 26 and supplied with electric power from the outside. A plunger 18 has a lower end disposed in the electromagnet 27 and is installed so that a circular plate portion thereof faces an upper surface of the electromagnet 27. A spring 28 is installed in the electromagnet 27 and elastically supports the plunger 18.

In this case, an upper end of the plunger 18 may extend upward while penetrating an upper surface of the housing 26, and may be coupled to a central portion of the diaphragm 17, that is, a central portion at the bottom of a fork 23 to be described below.

When the semi-active mount 19 is turned on, the plunger 18 is pulled downward by the electromagnet 27, and as a result, the switching valve 21 and the fork 23, which will be described below, move downward to open the hole 20. Further, when the semi-active mount 19 is turned off, the supply of electric power to the electromagnet is cut off, and the plunger 18 moves upward by force of the spring 28, such that the switching valve 21 and the fork 23 move upward to close the hole 20.

In particular, as illustrated in FIGS. 4A and 4B, the switching valve 21, which is formed as a rubber plate having a circular plate shape, and the fork 23, which is formed as a steel plate having a circular plate shape, are installed at a central portion of an upper surface of the diaphragm 17. The switching valve 21 and the fork 23 are coupled to each other by a structure in which a bottom surface at an edge of the switching valve 21 and an upper surface at an edge of the fork 23 are vertically stacked.

The switching valve 21 may block the hole 20 formed in the orifice circular plate 16, and a bottom surface of the fork 23 may be coupled to the plunger 18 of the semi-active mount 19.

The switching valve 21 has an upward convex shape, and a wall stands at the edge of the fork 23, such that the switching valve 21 and the fork 23 are combined to be vertically stacked while being coupled at the edges thereof.

Accordingly, the sealed air chamber 22, which may serve as an air spring, may be formed between the switching valve 21 and the fork 23.

The switching valve 21 and the fork 23 may open and close the hole 20 formed in the orifice circular plate 16 while moving upward and downward by the operation of the plunger 18 when the semi-active mount 19 is turned on and off.

Therefore, an operational state of the active engine mount for a vehicle, which is configured as described above, will be described below.

Figure 5A:
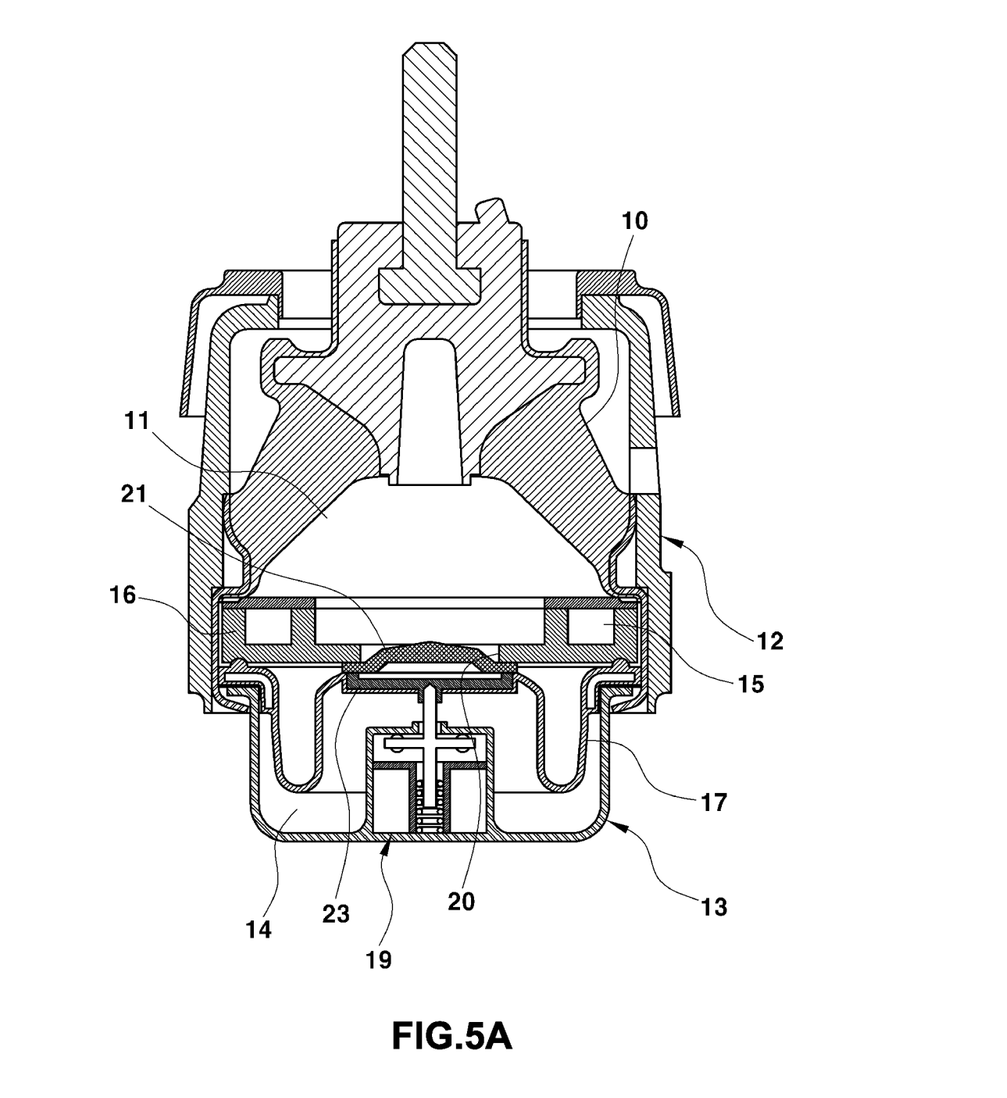
FIGS. 5A and 5B are a cross-sectional view and a perspective view illustrating an operational state at the time of large displacement in the active engine mount for a vehicle according to the exemplary embodiment of the present inventive concept.
Figure 5B:
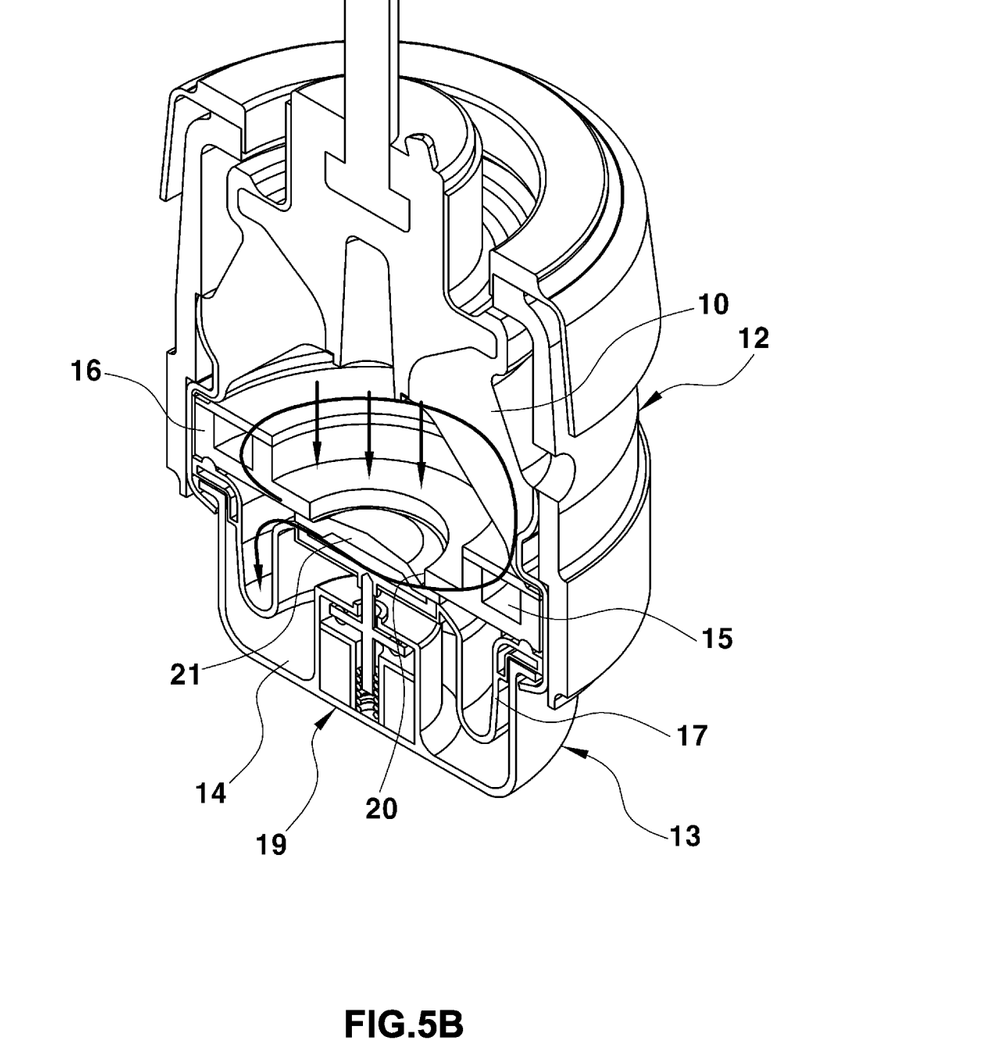

FIGS. 5A and 5B are a cross-sectional view and a perspective view illustrating an operational state at the time of large displacement in the active engine mount for a vehicle according to the exemplary embodiment of the present inventive concept.

As illustrated in FIGS. 5A and 5B, when the vehicle travels (10 to 12 Hz) when the semi-active mount is turned off, the fluid in the upper liquid chamber 11 passes through the orifice 15 formed in the orifice circular plate 16, thereby showing damping characteristics.

Accordingly, it is possible to improve secondary ride performance.

Figure 6A:
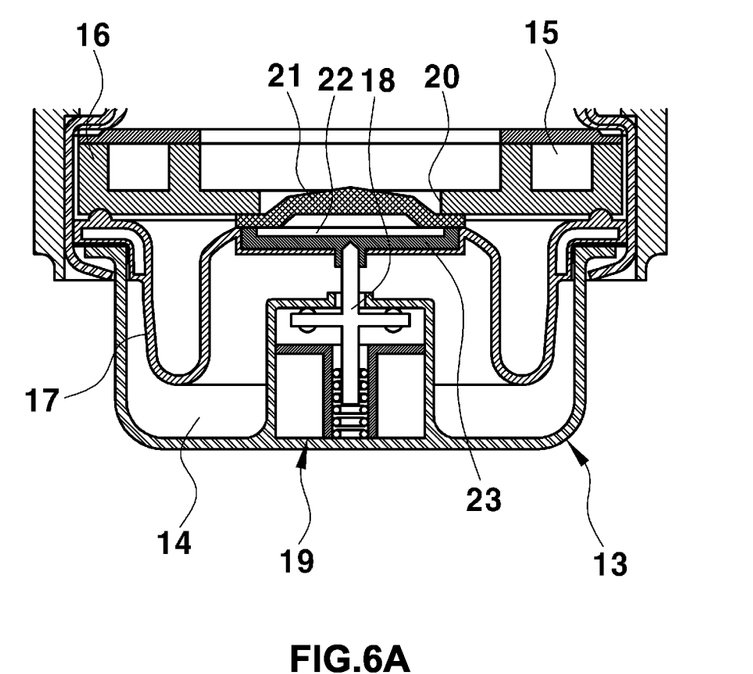
FIGS. 6A and 6B are a cross-sectional view and a perspective view illustrating an operational state at the time of small displacement in the active engine mount for a vehicle according to the exemplary embodiment of the present inventive concept
Figure 6B:
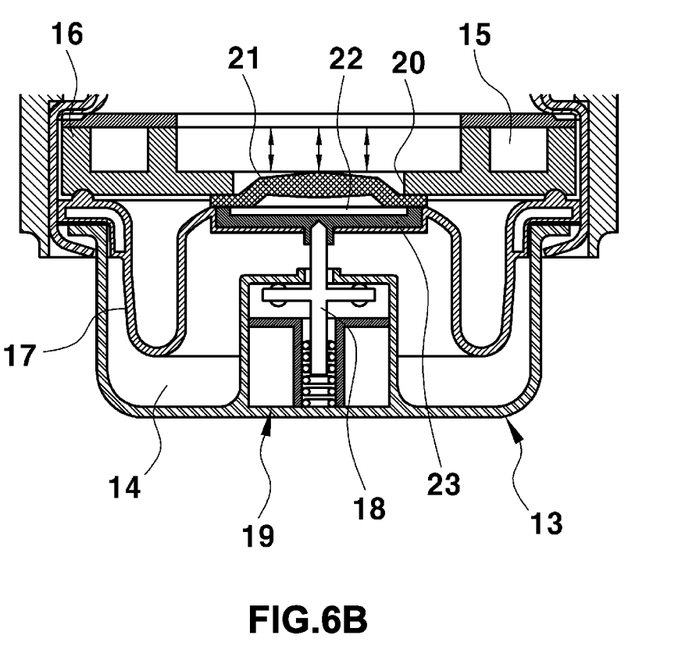

FIGS. 6A and 6B are a cross-sectional view and a perspective view illustrating an operational state at the time of small displacement in the active engine mount for a vehicle according to the exemplary embodiment of the present inventive concept.

As illustrated in FIGS. 6A and 6B, under a condition in which the semi-active mount is turned off, damping characteristics caused by vertical pressing deformation of the switching valve 21 are shown, and the air chamber 22 may serve as an air spring while being compressed and restored by the deformation of the switching valve 21 (like a fully inflated balloon) due to pressure of the fluid in the upper liquid chamber 11.

Accordingly, it is possible to reduce high-frequency micro displacement starting characteristics and prevent penetration sound and micro shaking.

Figure 7A:
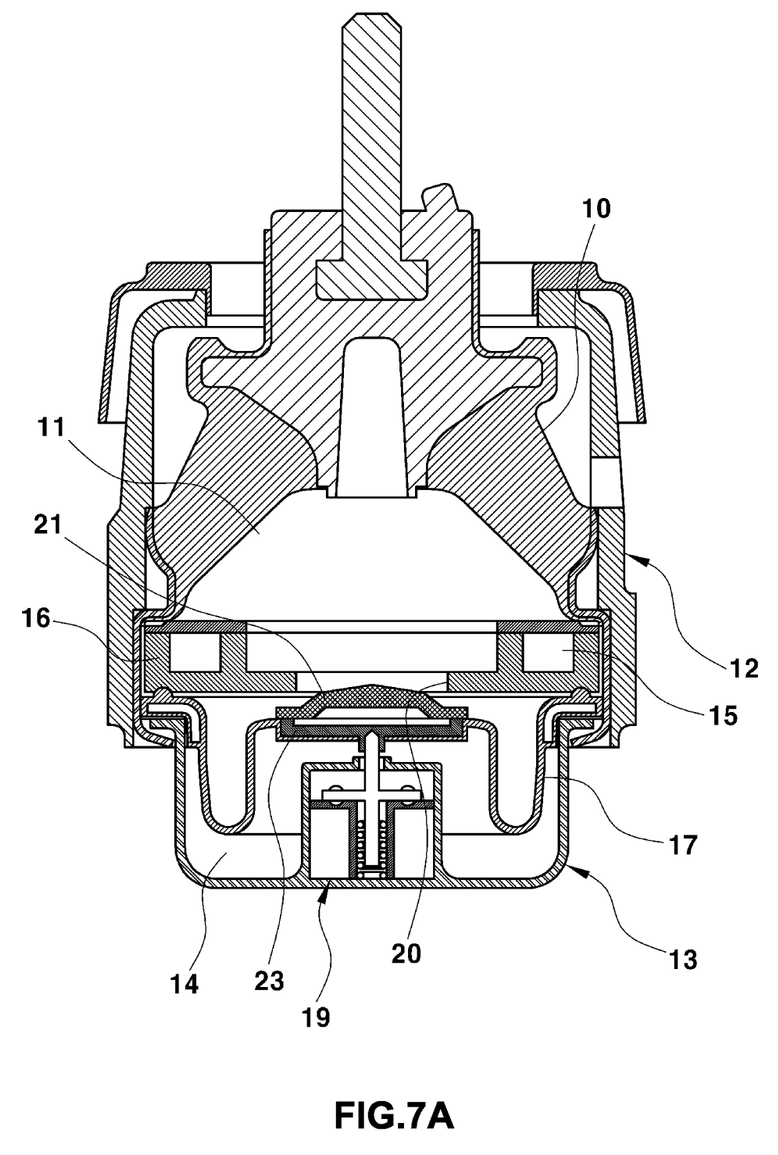
FIGS. 7A-7C are cross-sectional and perspective views illustrating an operational state under a condition in which a semi-active mount is turned on, in the active engine mount for a vehicle according to the exemplary embodiment of the present inventive concept.
Figure 7B:
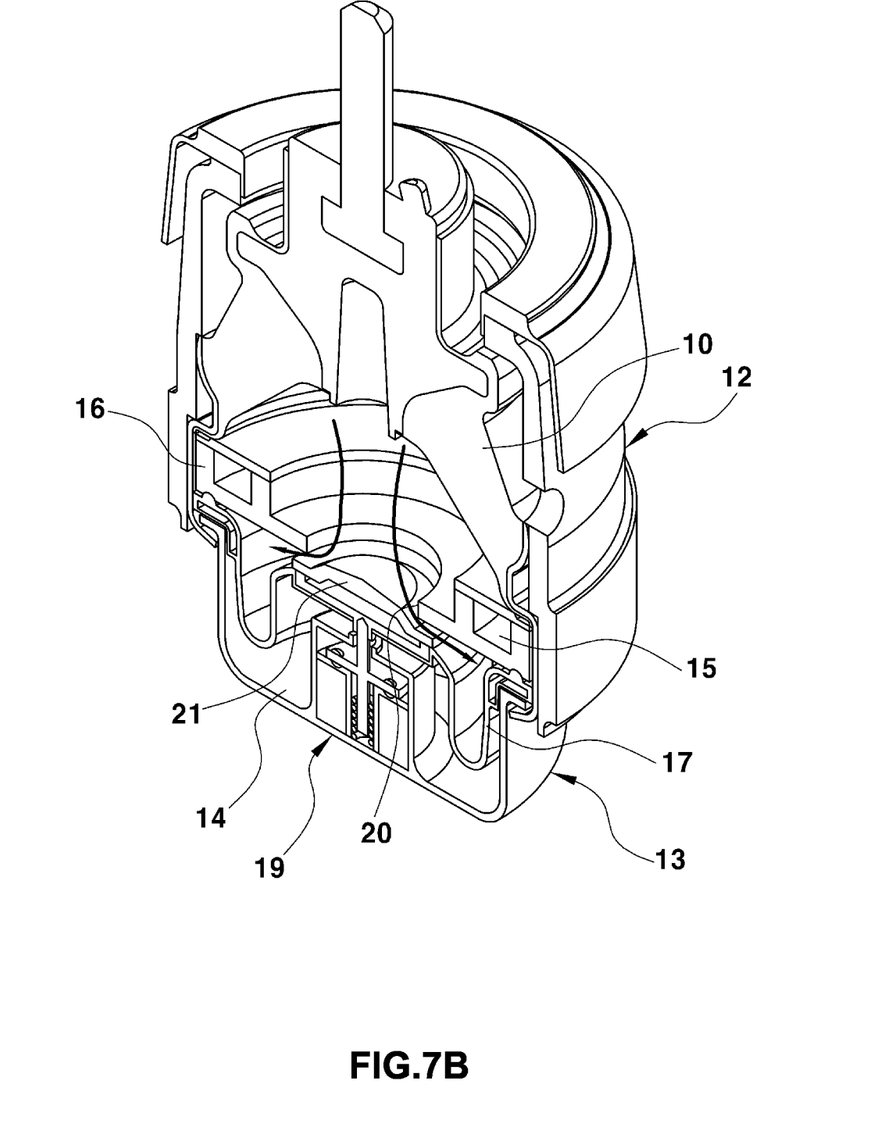
Figure 7C:
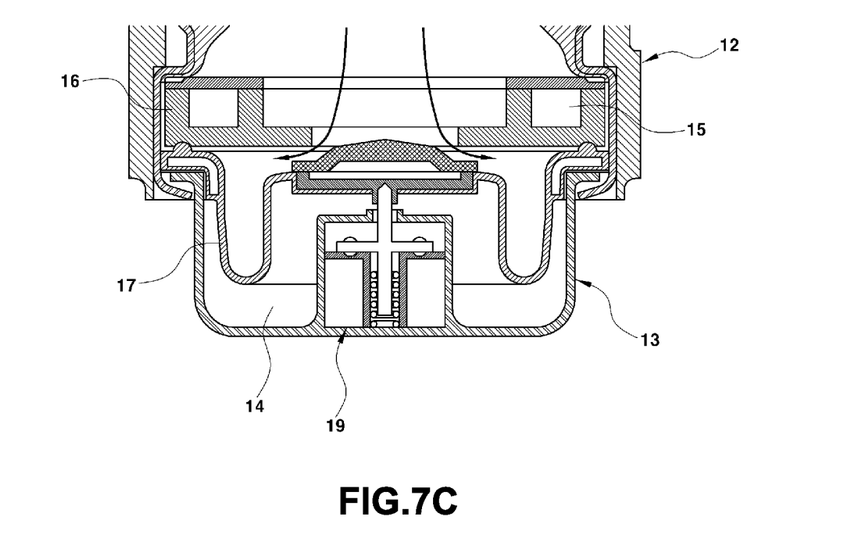

FIGS. 7A-7C are cross-sectional and perspective views illustrating an operational state under a condition in which a semi-active mount is turned on, in the active engine mount for a vehicle according to the exemplary embodiment of the present inventive concept.

As illustrated in FIGS. 7A-7C, damping characteristics when the semi-active mount is turned on are shown.

When the semi-active mount 19 is turned on, the plunger 18 is pulled, and both of the switching valve 21 and the fork 23, which are connected to the plunger 18, are moved downward, such that the hole 20 formed in the orifice circular plate 16 is open, and as a result, the fluid in the upper liquid chamber 11 may flow directly to the lower liquid chamber 14 through the hole 20.

That is, in order to improve a component C2, which is main excitation vibration, when the engine idles, a length of the orifice is shortened to move damping characteristics to a rear range (bandwidth of 20 to 30 Hz), and as a result, it is possible to maximize vibration isolation property by reducing dynamic characteristics of 20 to 30 Hz.

Here, when the orifice is selectively open, the fluid dominantly flows to a short portion where a frictional loss less occurs, and does not flow to a long portion.

Figure 8:
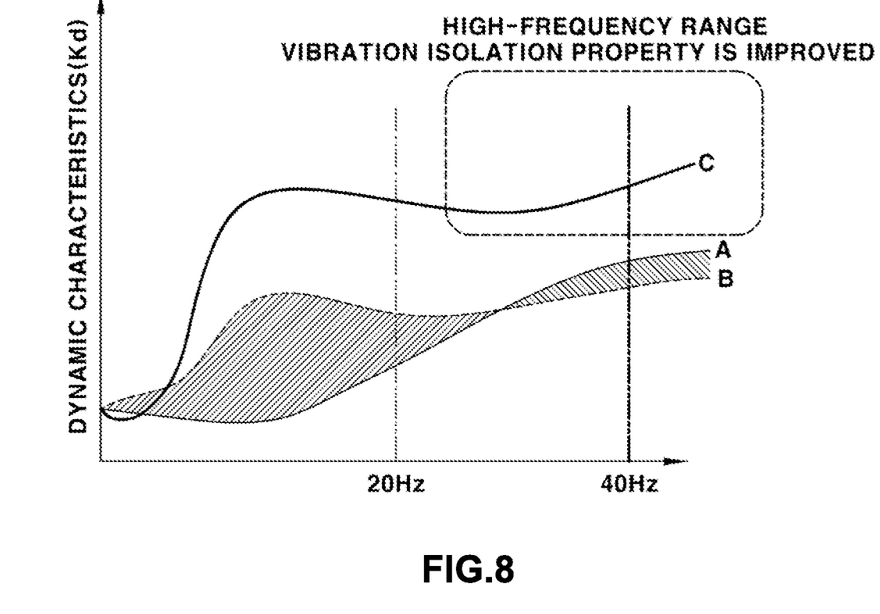
FIG. 8 is a graph illustrating dynamic characteristics of the active engine mount for a vehicle according to the exemplary embodiment of the present inventive concept.

FIG. 8 is a graph illustrating dynamic characteristics of an active engine mount for a vehicle according to an exemplary embodiment of the present inventive concept.

As illustrated in FIG. 8, FIG. 8 shows dynamic characteristics of the mount of the present invention, that is, an electronically variable flow path type mount A to which an air chamber is applied, a volume stiffness mount B, and a general fluid type mount C.

That is, as can be seen from a region indicated by a dotted line in the graph, it is possible to improve vibration isolation property by reducing dynamic characteristics at a high frequency.

As described above, the active engine mount of the present disclosure is an electronically switchable damper assembly that allows the fluid to flow between two chambers through a single elongated path by selectively changing a length of the elongated path if there are two chambers that are vertically disposed.

Therefore, a bypass mount may maximally improve vibration characteristics when the engine idles by minimizing dynamic characteristics at a low frequency (20 to 40 Hz), but increases characteristics at a high frequency.

However, the volume stiffness mount does not greatly improve an effect when the engine idles, because a change rate of dynamic characteristics is lower than that of the bypass mount.

The present disclosure adopts advantages of the bypass mount and the volume stiffness mount, and has the air chamber which is sealed by the vibratory plate that tunes a length of a single narrow path (orifice), such that the air chamber serves as an air spring when the switching valve is closed, and reduces dynamic characteristics at a high frequency (vibration isolation property is improved), thereby preventing excitation vibration, penetration sound, and micro shaking.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An active engine mount for a vehicle, comprising:
    an upper body which has a main rubber and an upper liquid chamber;
    a lower body which is coupled to a lower portion of the upper body;
    an orifice circular plate which divides an interior of the upper and lower bodies into the upper liquid chamber and a lower liquid chamber inside the upper and lower bodies and which has an orifice through which a fluid flows between the upper and lower liquid chambers;
    a diaphragm which is installed below the orifice circular plate inside the upper and lower bodies and which forms the lower liquid chamber;
    a semi-active mount which is in contact with a central portion of the diaphragm by a plunger inside the lower body and which operates by an electromagnet,
    a hole which is formed at a central portion of the orifice circular plate;
    a first fluid entrance hole which is formed at an end of the edge of the orifice to communicate with the lower liquid chamber and a second fluid entrance hole which is formed at an opposite end of the orifice at the central portion of the orifice circular plate to communicate with the upper liquid chamber; and
    a switching valve is configured to selectively open or close the hole in a position to cover the hole at the central portion of the diaphragm and to compressively deform by pressure of the fluid in the upper liquid chamber.

2. The active engine mount of claim 1, wherein the semi-active mount includes a housing formed at a central portion of the lower body, and
    the electromagnet is disposed in the housing.

3. The active engine mount of claim 2, wherein the electromagnet has a spring therein to elastically support the plunger.

4. The active engine mount of claim 1, further comprising:
    a fork which is coupled to a bottom surface of a switching valve at the central portion of the diaphragm and which forms an air chamber between the fork and the switching valve.

5. The active engine mount of claim 1, wherein the switching valve and the fork are coupled to an upper end of the plunger of the semi-active mount, and open and close the hole formed in the orifice circular plate while moving upward and downward when the semi-active mount operates.

6. The active engine mount of claim 1, wherein the orifice circular plate has a ring-shaped vibratory plate on the upper surface thereof to cover an edge of the orifice by the ring-shaped vibratory plate.

7. An active engine mount for a vehicle, comprising:
    an upper body which has a main rubber and an upper liquid chamber;
    a lower body which is coupled to a lower portion of the upper body;
    an orifice circular plate which divides an interior of the upper and lower bodies into the upper liquid chamber and a lower liquid chamber inside the upper and lower bodies and which has an orifice through which a fluid flows between the upper and lower liquid chambers;
    a diaphragm which is installed below the orifice circular plate inside the upper and lower bodies and which forms the lower liquid chamber;
    a semi-active mount which is in contact with a central portion of the diaphragm by a plunger inside the lower body and which operates by an electromagnet;
    a hole which is formed at a central portion of the orifice circular plate;
    a first fluid entrance hole which is formed at an end of the edge of the orifice to communicate with the lower liquid chamber and a second fluid entrance hole which is formed at an opposite end of the orifice at the central portion of the orifice circular plate to communicate with the upper liquid chamber;
    a switching valve which is configured to selectively open or close the hole in a position to cover the hole at the central portion of the diaphragm and to compressively deform by pressure of the fluid in the upper liquid chamber; and
    a fork which has a wall standing along an edge of the fork, the wall being coupled to a bottom surface of the switching valve at the central portion of the diaphragm; and
    an air chamber sealed by the bottom surface of the switching valve, the fork and the wall between the fork and the switching valve.

* * * * *